Patented May 24, 1932

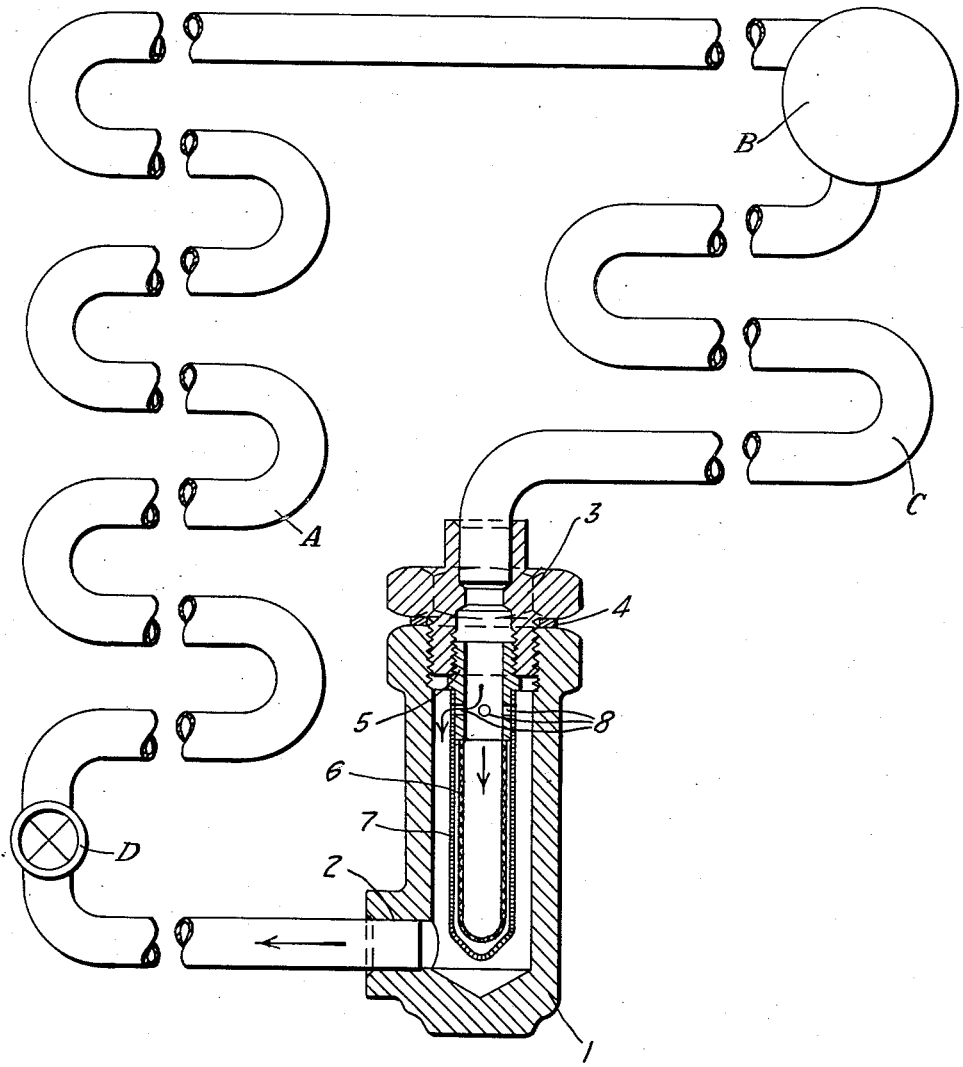

1,859,766

UNITED STATES PATENT OFFICE

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY

FILTERING APPARATUS FOR REFRIGERATING SYSTEMS

Application filed July 24, 1928. Serial No. 294,998.

This invention relates to means for removing impurities and foreign matter from a circulated fluid medium. It has particular application to refrigerating systems arranged to operate on the vapor-gas principle disclosed in my U. S. Patent No. 1,619,916, issued March 1, 1927.

Heretofore various devices in the nature of screens, sponges, etc., have been used for filtering out impurities from refrigerating systems. So far as known, none of such devices actually remove very small particles of foreign matter such as worn metal dust, etc., which is frequently found in suspension in the circulated liquid.

Among the objects of the invention are to remove suspended foreign matter from a circulated liquid, to provide simple, effective and cheap means for accomplishing this result, and in general to improve prior filtering devices in the interest of more efficient and satisfactory service.

The invention consists broadly in the utilization of material which will pass liquid freely therethrough but will intercept and retain everything which is non-fluid regardless of size and of its being in suspension in the liquid. It further consists in suitable apparatus for disposing the material in the path of movement of the liquids to be filtered. The material is dense but porous and in the preferred arrangement it is shaped as a thimble or cup and so disposed that all circulated liquid must pass therethrough.

In order to illustrate the invention the single view of the accompanying drawing indicates diagrammatically a refrigerating system of the closed cycle type and shows the filtering device in vertical section.

The refrigerating system diagrammatically shown is of the closed cycle compression type and comprises an evaporator A containing a volatile liquid or refrigerant solution, the pressure of which is suitably reduced to effect evaporation of the same through the action of the pump or compressor B which discharges the gaseous products of evaporator A at higher temperature and pressure into a condenser C from which heat is extracted by suitable means (not shown) and from which the condensate is returned by a suitable feeding device or expansion valve D to the evaporator A, thus completing the cycle. The above elements may be of any suitable or desired type but by preference the feeding device D takes the form of an expander adapted to pass not only the liquid products of condenser C but also any residual gaseous products so that the system may operate, if desired, upon the vapor-gas principle disclosed in my aforesaid Patent No. 1,619,916.

In order that there may be no interference with the proper functioning of the system through complete or partial plugging of the feeding device D by foreign matter, suitable means are provided for removing from the circulated liquid all palpable impurities, even those which are so fine as to be carried in suspension. The preferred position for such a device is adjacent feeding device D and between the latter and condenser C as shown in the drawing. In the form shown the device comprises a casing 1 open at one end and having an outlet port 2 adjacent the closed end, from which port extends the connection leading to feeding device D. The open end of the casing is closed by a suitable closure member 3 which may take the form of a plug threaded into the open end of the casing, the joint being sealed by a gasket 4. Closure plug 3 has a central or axial opening or bore forming the inlet to the filter casing, and in turn connected to condenser C. This bore may be enlarged at its lower end to receive a short nipple or pipe conduit 5 which projects into the large chamber of the casing. Supported adjacent the inlet opening of nipple or conduit 5 is a filter member 6 of dense but porous material and of a shape to catch and retain liquid while it permeates the wall of the member. By preference the member takes the form of a thimble or cup and is of any suitable or desired material such as paper of filter grade, unglazed earthenware, etc. It is found that the so-called "extraction thimbles" such as are used in the Soxhlet extraction apparatus are well adapted for the purpose. While any suitable arrangement for supporting the filter member may be provided, the preferred support is of foraminous material such as wire gauze or other perforated material and takes the form of a cage 7 suspended from nipple 5 and arranged to enclose the paper extraction thimble or other filter member.

When a filter device of the type shown is used with a compression system operating on the vapor-gas principle, it is preferable to by-pass the gaseous products of condenser C around the filter member so as to avoid the resistance which would be offered by the latter. To this end, the short nipple or conduit member 5 is made with one or more radial ports 8 above the filter member 6 so that the residual or uncondensed gaseous products of condenser C may pass directly from the inlet of the filter device to the large chamber of filter casing 1.

While the invention has been herein disclosed in what is now considered a preferred form, it is to be understood that the invention is not limited to the specific details thereof but covers all changes, modifications, and adaptations within the scope of the appended claims.

I claim as my invention:

1. In a closed cycle system arranged to circulate a volatile liquid and to produce heat transforming effects through change of state of said liquid, means in said system for filtering out of said liquid all suspended matter regardless of the fineness of the same, and means providing a constantly open by-pass around said filtering means for any gaseous products present in the system at that point.

2. In a refrigerating system having a compressor, a condenser, an expansion device, and an evaporator connected together to form a closed cycle system, means interposed between said condenser and said device for filtering out of the liquid all suspended matter and for continuously by-passing around said filtering means the gaseous products of said condenser.

3. In a refrigerating system having a compressor, a condenser, an expansion valve and an evaporator connected together to form a closed cycle system, a filter device interposed between said condenser and said valve providing a dense porous extraction member through which the circulated liquid is caused to pass, and means continuously by-passing around said member the gaseous products of said condenser to enable the system to operate on the vapor-gas principle.

4. In a refrigerating system having a compressor, a condenser, an expansion valve and an evaporator connected together to form a closed cycle system, a filter device interposed between said condenser and said valve providing an inlet chamber and an outlet chamber, a thimble shaped extraction member separating said inlet chamber from said outlet chamber and vertically disposed to receive all liquid from said condenser, and one or more by-pass openings from said inlet chamber to said outlet chamber to permit gas to pass without encountering the resistance of said extraction member.

5. In a refrigerating system a filter device for the liquid refrigerant comprising an open ended casing, a plug for closing said open end and providing an inlet, said plug having a short conduit extending from said inlet within said casing, a hollow filter member of dense porous material, and means supporting said member immediately beneath said conduit, said plug having means for by-passing gases from said inlet directly to the interior of said casing.

6. In a refrigerating system a filter device for the liquid refrigerant comprising an open ended casing, a plug for closing said open end and providing an inlet, said plug having a short conduit extending from said inlet within said casing, a hollow filter member of dense porous material, and means supporting said member immediately beneath said conduit, said conduit having one or more radial ports for passing gases from said inlet directly to the interior of said casing.

7. In a refrigerating system a filter device for the liquid refrigerant comprising an open ended casing, a plug for closing said open end and providing an inlet, said plug having a short conduit extending from said inlet within said casing, a hollow filter member of dense porous material, and a foraminous cage suspended from said conduit and enclosing and supporting said member in position to receive all liquid from said inlet, said conduit having one or more radial ports for passing gases from said inlet directly to the interior of said casing.

Signed by me at Detroit, in the county of Wayne and State of Michigan, this 19th day of July, 1928.

RANSOM W. DAVENPORT.